US009804995B2

(12) United States Patent
Bourd et al.

(10) Patent No.: US 9,804,995 B2
(45) Date of Patent: Oct. 31, 2017

(54) COMPUTATIONAL RESOURCE PIPELINING IN GENERAL PURPOSE GRAPHICS PROCESSING UNIT

(75) Inventors: Alexei V. Bourd, San Diego, CA (US); Andrew Gruber, Arlington, MA (US); Aleksandra L. Krstic, San Diego, CA (US); Robert J. Simpson, Espoo (FI); Colin Sharp, Cardiff, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1045 days.

(21) Appl. No.: 13/007,333

(22) Filed: Jan. 14, 2011

(65) Prior Publication Data

US 2012/0185671 A1    Jul. 19, 2012

(51) Int. Cl.
*G06F 15/00* (2006.01)
*G06F 15/76* (2006.01)
*G06F 15/173* (2006.01)

(52) U.S. Cl.
CPC ............................. *G06F 15/17325* (2013.01)

(58) Field of Classification Search
None
See application file for complete search history.

(56) References Cited

U.S. PATENT DOCUMENTS

| 4,751,671 A * | 6/1988 | Babetski et al. ................. 710/56 |
| 4,807,183 A * | 2/1989 | Kung et al. .................... 710/317 |
| 5,355,508 A * | 10/1994 | Kan ..................... G06F 15/8007 |
| | | 712/20 |
| 6,919,736 B1 * | 7/2005 | Agrawal et al. ................ 326/41 |
| 7,389,006 B2 | 6/2008 | Hutchins et al. |

(Continued)

FOREIGN PATENT DOCUMENTS

| CN | 1235307 A | 11/1999 |
| CN | 1398369 A | 2/2003 |

(Continued)

OTHER PUBLICATIONS

International Search Report and Written Opinion—PCT/US2012/021344—ISA/EPO—dated Apr. 11, 2012.

(Continued)

*Primary Examiner* — George Giroux
(74) *Attorney, Agent, or Firm* — Campbell C. Chiang

(57) ABSTRACT

This disclosure describes techniques for extending the architecture of a general purpose graphics processing unit (GPGPU) with parallel processing units to allow efficient processing of pipeline-based applications. The techniques include configuring local memory buffers connected to parallel processing units operating as stages of a processing pipeline to hold data for transfer between the parallel processing units. The local memory buffers allow on-chip, low-power, direct data transfer between the parallel processing units. The local memory buffers may include hardware-based data flow control mechanisms to enable transfer of data between the parallel processing units. In this way, data may be passed directly from one parallel processing unit to the next parallel processing unit in the processing pipeline via the local memory buffers, in effect transforming the parallel processing units into a series of pipeline stages.

30 Claims, 5 Drawing Sheets

(56) References Cited

U.S. PATENT DOCUMENTS

| | | | |
|---|---|---|---|
| 7,725,688 B1 | 5/2010 | Stoll et al. | |
| 2002/0083306 A1* | 6/2002 | Pessolano et al. | 712/220 |
| 2003/0001614 A1* | 1/2003 | Singh et al. | 326/40 |
| 2005/0083222 A1* | 4/2005 | Nickel et al. | 341/155 |
| 2007/0113232 A1* | 5/2007 | Collard | G06F 9/52 718/101 |
| 2008/0001953 A1 | 1/2008 | Nagao et al. | |
| 2008/0109795 A1* | 5/2008 | Buck | G06F 8/443 717/137 |
| 2010/0079454 A1 | 4/2010 | Legakis et al. | |
| 2011/0141122 A1* | 6/2011 | Hakura et al. | 345/505 |

FOREIGN PATENT DOCUMENTS

| | | |
|---|---|---|
| EP | 0560020 A2 | 9/1993 |
| JP | H06282447 A | 10/1994 |
| JP | 2004515856 A | 5/2004 |
| JP | 2008009697 A | 1/2008 |
| JP | 2010244096 A | 10/2010 |
| JP | 2010287110 A | 12/2010 |
| WO | WO0246917 A1 | 6/2002 |

OTHER PUBLICATIONS

Udupa et al., "Software Pipelined Execution of Stream Programs on GPUs," 2009 International Symposium on Code Generation and Optimization, Mar. 2009, 10 pp.

Munshi, "The OpenCL Specification," Version 1.0, Document Revision 48, Khronos OpenCL Working Group, Oct. 2009, 308 pp.

Munshi, "The OpenCL Specificaion," Version 1.1, Document Revision 36, Khronos OpenCL Working Group, Sep. 30, 2010, 379 pp.

Montrym J. et al., "The GeForce 6800", IEEE Micro, IEEE Service Center, Los Alamitos, CA, US, vol. 25, No. 2, Mar. 1, 2005 (Mar. 1, 2005), pp. 41-51, XP011134867, ISSN: 0272-1732, DOI: 10.1109/MM.2005.37.

* cited by examiner

COMPUTATIONAL RESOURCE PIPELINING IN GENERAL PURPOSE GRAPHICS PROCESSING UNIT

TECHNICAL FIELD

This disclosure relates to processing data and, more particularly, processing data using a general purpose graphics processing unit (GPGPU)

BACKGROUND

General purpose graphics processing units (GPGPUs) are generalized versions of graphics processing units originally designed to process 2D and 3D graphics. GPGPUs extend the high power parallel processing of GPUs to general purpose data processing applications beyond graphics processing. As one example, a GPU may be configured to process data in accordance with the OpenCL specification that gives certain applications access to the graphics processing unit for non-graphical computing. The "OpenCL Specification, Version 1.1," was released in June 2010 and is publicly available.

GPGPUs include programmable processing units arranged in a highly parallel structure that does not allow for data sharing or synchronization between the processing units. Instead, the individual processing units only exchange data sets with an external memory. Due to this structure, applications for GPGPUs are limited to those that are inherently parallel. GPGPU architectures may be so highly parallelized that they prevent efficient implementation of pipeline-based computations. This limitation extends to 2D and 3D graphics processing that use parallel processing at each processing stage, but require pipelining of computation resources between the stages.

SUMMARY

This disclosure describes techniques for extending the architecture of a general purpose graphics processing unit (GPGPU) with parallel processing units to allow efficient processing of pipeline-based applications. For example, the techniques may include configuring local memory buffers connected to parallel processing units operating as stages of a processing pipeline to hold data for transfer between the parallel processing units. The local memory buffers allow on-chip, low-power, direct data transfer between the parallel processing units. The local memory buffers may include hardware-based data flow control mechanisms to enable transfer of data between the parallel processing units. In this way, data may be passed directly from one parallel processing unit to the next parallel processing unit in the processing pipeline via the local memory buffers, in effect transforming the parallel processing units into a series of pipeline stages. The local memory buffers may significantly reduce memory bandwidth usage by reducing or eliminating the need for each of the parallel processing units in the processing pipeline to make calls to the system memory to retrieve and/or store data.

The techniques may include, in some examples, configuring each of the local memory buffers to have a width required for the buffer to hold data output from a previous parallel processing unit. For example, the local memory buffers may be hardware-based buffers that are configurable to exchange depth for width. In addition, in some examples, the techniques may include executing sequencing barriers to preserve data sequence within the processing pipeline. For example, a sequence of the data threads of a data set may be recorded upon entry of the data set to a parallel processing unit and, after the data set is processed, the data threads of the data set may be released from the parallel processing unit in the same sequence as recorded.

In one example, this disclosure is directed to a GPGPU comprising two or more parallel processing units configured to operate selectively as stages of a processing pipeline, and one or more local memory buffers, each of the buffers connected between two of the parallel processing units, configured to hold data for transfer between the parallel processing units.

In another example, this disclosure is directed to a method of processing data with a GPGPU, comprising configuring two or more parallel processing units to operate selectively as stages of a processing pipeline, and configuring one or more local memory buffers, each of the buffers connected between two of the parallel processing units, to hold data for transfer between the parallel processing units.

In a further example, this disclosure is directed to a GPGPU comprising means for configuring two or more parallel processing units to operate selectively as stages of a processing pipeline, and means for configuring one or more local memory buffers, each of the buffers connected between two of the parallel processing units, to hold data for transfer between the parallel processing units.

In another example, this disclosure is directed to a computer-readable medium comprising instructions for processing data with a GPGPU that, when executed, cause a programmable processor to configure two or more parallel processing units to operate selectively as stages of a processing pipeline, and configure one or more local memory buffers, each of the buffers connected between two of the parallel processing units, to hold data for transfer between the parallel processing units.

The details of one or more examples are set forth in the accompanying drawings and the description below. Other features, objects, and advantages will be apparent from the description and drawings, and from the claims.

DETAILED DESCRIPTION

This disclosure describes techniques for extending the architecture of a general purpose graphics processing unit (GPGPU) with parallel processing units to allow efficient processing of pipeline-based applications. Specifically, the techniques include configuring local memory buffers connected to parallel processing units operating as stages of a processing pipeline to hold data for transfer between the parallel processing units. The local memory buffers allow on-chip, low-power, direct data transfer between the parallel processing units. The local memory buffers may include hardware-based data flow control mechanisms to enable transfer of data between the parallel processing units. In this way, data may be passed directly from one parallel processing unit to the next parallel processing unit in the processing pipeline via the local memory buffers, in effect transforming the parallel processing units into a series of pipeline stages. The local memory buffers may significantly reduce memory bandwidth usage by reducing or eliminating the need for each of the parallel processing units in the processing pipeline to make calls to the system memory to retrieve and/or store data.

Figure 1:
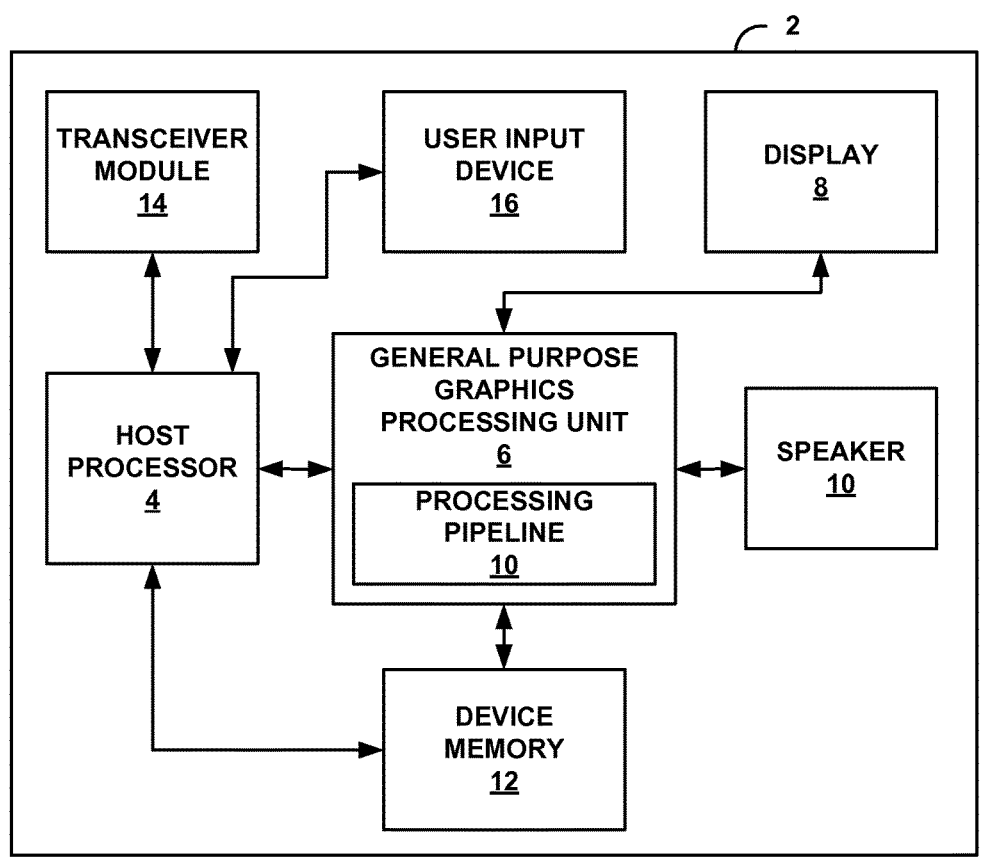
FIG. 1 is a block diagram illustrating a device that includes a general purpose graphics processing unit (GPGPU) that is configurable to implement a processing pipeline.

FIG. 1 is a block diagram illustrating a device 2 that includes a general purpose graphics processing unit (GPGPU) 6 that is configurable to implement a processing pipeline 10. As described in more detail below, processing pipeline 10 of GPGPU 6 includes two or more parallel processing units configured to operate as stages of processing pipeline 10 and one or more local memory buffers configured to hold data for transfer between the parallel processing units to implement processing pipeline 10.

Device 2 is capable of transmitting and receiving data, supporting a variety of data processing applications, and outputting processed data for presentation to a user. Examples of device 2 include, but are not limited to, mobile wireless telephones, personal digital assistants (PDAs), video gaming devices, video gaming consoles, video conferencing units, laptop computers, desktop computers, tablet computers, television set-top boxes, digital recording devices, digital media players, and the like.

In the example illustrated in FIG. 1, device 2 includes a host processor 4, a GPGPU 6 with a processing pipeline 10, a display 8, a speaker 10, a device memory 12, a transceiver module 14, and a user input device 16. In other cases, for example, when device 2 is a desktop computer, display 8, speaker 10 and/or user interface 16 may be external to device 2. Host processor 4 and GPGPU 6 may comprise digital signal processors (DSPs), general purpose microprocessor, application specific integrated circuits (ASICs), field programmable gate arrays (FPGAs), or other equivalent integrated or discrete logic circuitry.

Host processor 4 may execute one or more applications. Examples of the applications include web browsers, e-mail applications, spreadsheets, video games, audio and video editing applications, or other applications that generate visual and/or audio output for presentation to a user via display 8 and/or speaker 10. GPGPU 6 may also execute one or more applications. GPGPU 6 may execute applications in support of the applications executed by host processor 4. Specifically, GPGPU 6 may execute applications to prepare data for presentation to a user via display 8 and/or speaker 10.

GPGPU 6 is a generalized version of a graphics processing unit (GPU) that extends the high power parallel processing of the GPU to general purpose data processing applications beyond graphics processing. As an example, GPGPU 6 may be configured to process data in accordance with the OpenCL specification that gives certain applications access to a GPU for non-graphical computing. Conventional GPGPUs, described in more detail below with respect to FIG. 2, include programmable processing units arranged in a highly parallel structure that prevents efficient implementation of pipeline-based applications. This limitation extends to 2D and 3D graphics processing applications that use parallel processing at each processing stage, but require pipelining of computation resources between the stages.

Pipeline-based applications require a data set to be processed in stages such that a first stage is configured to process an original data set, a second stage is configured to process the output of the first stage, a third stage is configured to process the output of the third stage, and so on for the number of stages required for the application. The most efficient implementation of pipeline-based applications is to pass the data sets directly from one stage to the next stage in the processing pipeline. A less efficient implementation of pipeline-based applications is for each stage in the processing pipeline to retrieve data processed by a previous stage from an off-chip memory and then store the processed data back to the off-chip memory for the next stage. This less efficient implementation still requires sequencing mechanisms to ensure the data set is processed in the correct sequence by each stage in the processing pipeline. Conventional GPGPUs cannot be configured to implement processing pipelines or even the sequencing mechanisms necessary to perform pipeline-based applications.

According to the techniques in this disclosure, and unlike conventional GPGPUs, in some examples, GPGPU 6 is configurable to implement processing pipeline 10 to execute pipeline-based applications, including 2D and 3D graphics processing applications. As described in more detail below with respect to FIG. 3, processing pipeline 10 of GPGPU 6 includes two or more parallel processing units configured to operate as stages of processing pipeline 10 and one or more local memory buffers configured to hold data for transfer between the parallel processing units to implement processing pipeline 10. The local memory buffers included in processing pipeline 10 allow on-chip, low-power, direct data transfer between the parallel processing units. In this way, data may be passed directly from one parallel processing unit to the next parallel processing unit in processing pipeline 10 via the local memory buffers, in effect transforming the parallel processing units into a series of pipeline stages. The implementation of processing pipeline 10 may significantly reduce memory bandwidth usage by reducing or eliminating the need for each of the parallel processing units in processing pipeline 10 to make calls to device memory 12, located off-chip from GPGPU 6, to retrieve and/or store data.

The techniques of this disclosure may include configuring each of the local memory buffers within processing pipeline 10 to have a width required for the buffer to hold data output from a previous parallel processing unit. For example, the local memory buffers may be hardware-based buffers that are configurable to exchange depth for width. In addition, the techniques include executing sequencing barriers to preserve a data sequence within processing pipeline 10. For example, a sequence of the data threads of a data set may be recorded upon entry of the data set to a parallel processing unit within processing pipeline 10 and, after the data set is processed, the data threads of the data set may be released from the parallel processing unit in the same sequence as recorded.

For example, when GPGPU 6 is configured to implement processing pipeline 10, GPGPU 6 may execute pipeline-based 2D and 3D graphics processing applications in support of the web browser, e-mail, video game, and video editing applications executed by host processor 4. As another example, when GPGPU 6 is not configured to implement processing pipeline 10, GPGPU 6 may execute applications that operate efficiently in a highly parallel structure, such as image-based search applications, image descriptor generation/extraction, radiometric image adjustments, audio processing, and other operations typically performed by host processor 4.

In some cases, GPGPU 6 may execute applications in support of pipeline-based graphics processing applications. The pipeline-based graphics processing applications may be executed by GPGPU 6 itself using processing pipeline 10 or by a separate GPU included in device 2. For example, GPGPU 6 may execute image special effects applications, vertices generation for a GPU pipeline, and graphics post-processing applications using a color buffer from a GPU pipeline.

Display 8 and speaker 10 both comprise output devices for device 2. In some cases, display 8 and speaker 10 may be used together to present both visual and audio output to a user. In other cases, display 8 and speaker 10 may be used separately to present output to the user. As an example, display 8 may comprise a liquid crystal display (LCD), a cathode ray tube (CRT) display, a plasma display, or another type of display device.

User input device 16 comprises one or more user input devices for device 2. For example, user input device 16 may include a trackball, a mouse, a keyboard, a microphone and/or other types of input devices. In some examples, user input device 16 may comprise a touch screen and may be incorporated as a part of display 8. A user may select the one or more applications to be executed by host processor 4 and/or GPGPU 6 via user input device 16.

Host processor 4 may download data to be processed by host processor 4 and/or GPGPU 6 via transceiver module 14. Host processor 4 may also download the one or more applications executed by host processor 4 and/or GPGPU 6 via transceiver module 14. Transceiver module 14 may include circuitry to allow wireless or wired communication between device 2 and another device or a network. Transceiver module 14 may include modulators, demodulators, amplifiers and other such circuitry for wired or wireless communication.

Device memory 12 may store data to be processed by host processor 4 and/or GPGPU 6, and may also store processed data received from host processor 4 and/or GPGPU 6. In addition, device memory 12 may store the one or more applications executed by host processor 4 and/or GPGPU 6. Device memory 12 may comprise one or more computer-readable storage media. Examples of device memory 12 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor.

Figure 2:
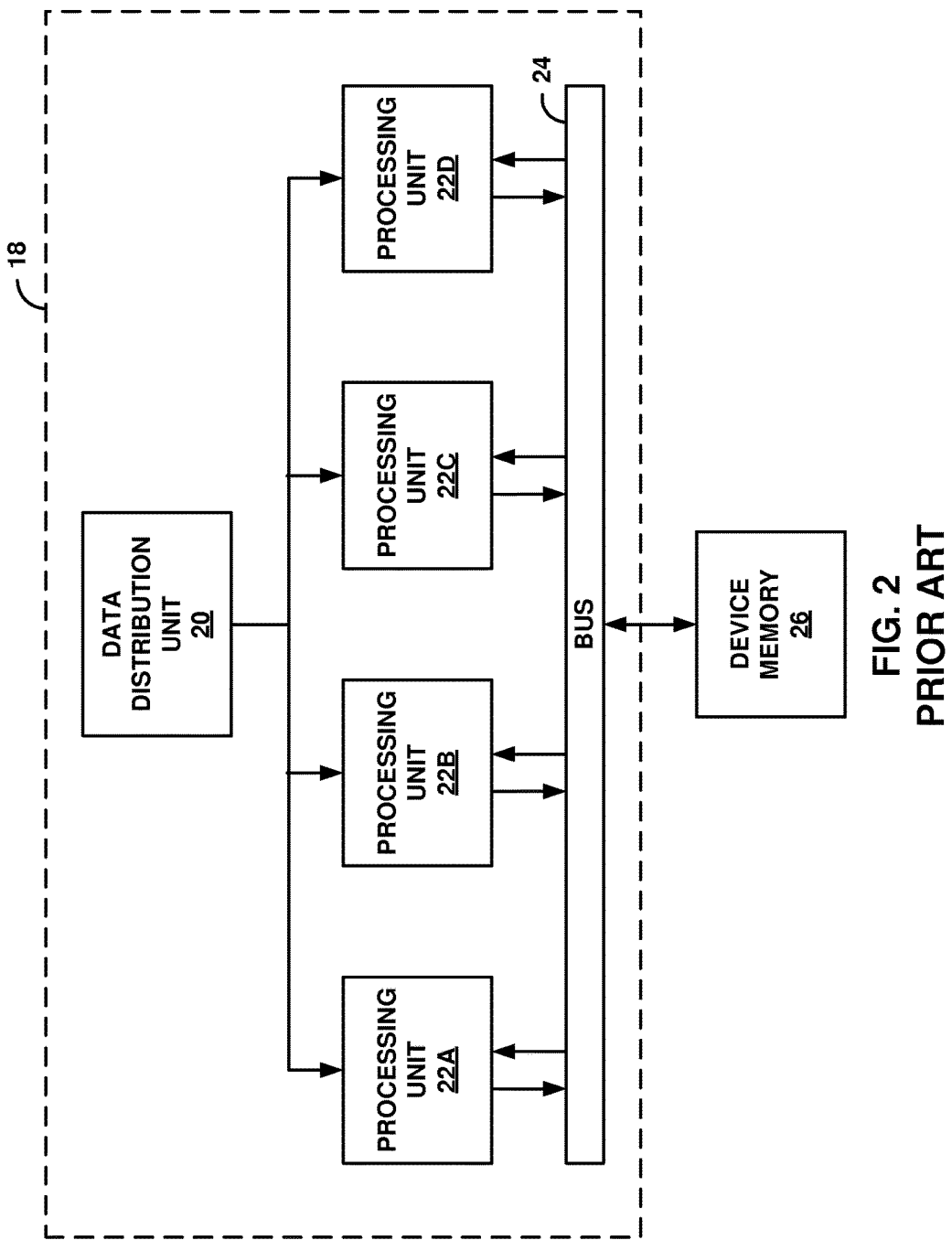
FIG. 2 is a block diagram illustrating a conventional GPGPU including parallel processing units configured to perform parallel processing.

FIG. 2 is a block diagram illustrating a conventional GPGPU 18 including parallel processing units 22A-22D configured to perform parallel processing. In some examples, GPGPU 18 may be included within a device substantially similar to device 2 described above in reference to FIG. 1. GPGPU 18 includes a data distribution unit 20, parallel processing units 22A-22D ("parallel processing units 22"), and bus 24 to connect parallel processing units 22 to device memory 26 external to GPGPU 18.

Conventional GPGPU 18 is a generalized version of a GPU originally designed to process 2D and 3D graphics. GPGPU 18 is capable of extending the high power parallel processing of a GPU to general purpose processing applications beyond graphics processing. As an example, GPGPU 18 may be configured to process data in accordance with the OpenCL specification. The OpenCL specification gives certain applications access to a GPU for non-graphical computing. In OpenCL terminology, data threads are referred to as work items, data sets are referred to as work groups, processing units are referred to as compute units, and a collection of processing units referred to as a compute group.

A typical GPU task is highly parallel and requires no information exchange between data threads of a data set being processed within a given processing unit. For example, the values computed for a vertex are independent from the values computed for a different vertex, and the values computed for a pixel are independent from the values computed for a different pixel. In order to mimic the parallel nature of a GPU, GPGPU 18 is designed to include parallel processing units 22 arranged in a highly parallel structure.

The architecture of GPGPU 18 is so highly parallel that it does not allow for data sharing or synchronization between parallel processing units 22. In operation, data distribution unit 20 assigns a data set stored in device memory 26 to each of parallel processing units 22. During processing, data threads of an assigned data set may be shared and synchronized within each of parallel processing units 22. Data threads of different data sets, however, cannot be shared or synchronized between parallel processing units 22. Instead, each of parallel processing units 22 only exchanges the assigned data sets with device memory 26 via bus 24. More specifically, each of parallel processing units 22 retrieve the assigned data sets for processing from device memory 26 via bus 24 and, after processing the data sets, store the processed data sets back in device memory 26 via bus 24.

The parallel architecture of GPGPU 18 prevents efficient implementation of pipeline-based applications between parallel processing units 22. In pipeline-based applications, processing units are connected as stages in a pipeline to enable data to travel from one stage to another stage for different processing tasks. The limitation against pipeline-based applications in GPGPU 18 extends to 2D and 3D graphics processing applications, which use parallel processing at each processing stage, but require pipelining between the stages.

The applications for GPGPU 18 are, therefore, limited to those that are inherently parallel. Each of parallel processing units 22 may comprise a cluster of arithmetic logic units (ALUs) or other configurable logic elements. Parallel processing units 22 are, therefore, programmable or configurable to perform different operations depending on the application executed by GPGPU 18. Applications that operate efficiently in the highly parallel structure of GPGPU 18 may include image based search applications, image descriptor generation/extraction, radiometric image adjustments, audio processing, other operations typically performed by a digital signal processor (DSP), and the like. In addition, applications executed by GPGPU 18 may require interaction with pipeline-based graphics processing applications, such as image special effects generation, vertices generation for a GPU pipeline, and graphics post-processing operations using a color buffer from a GPU pipeline.

Figure 3:
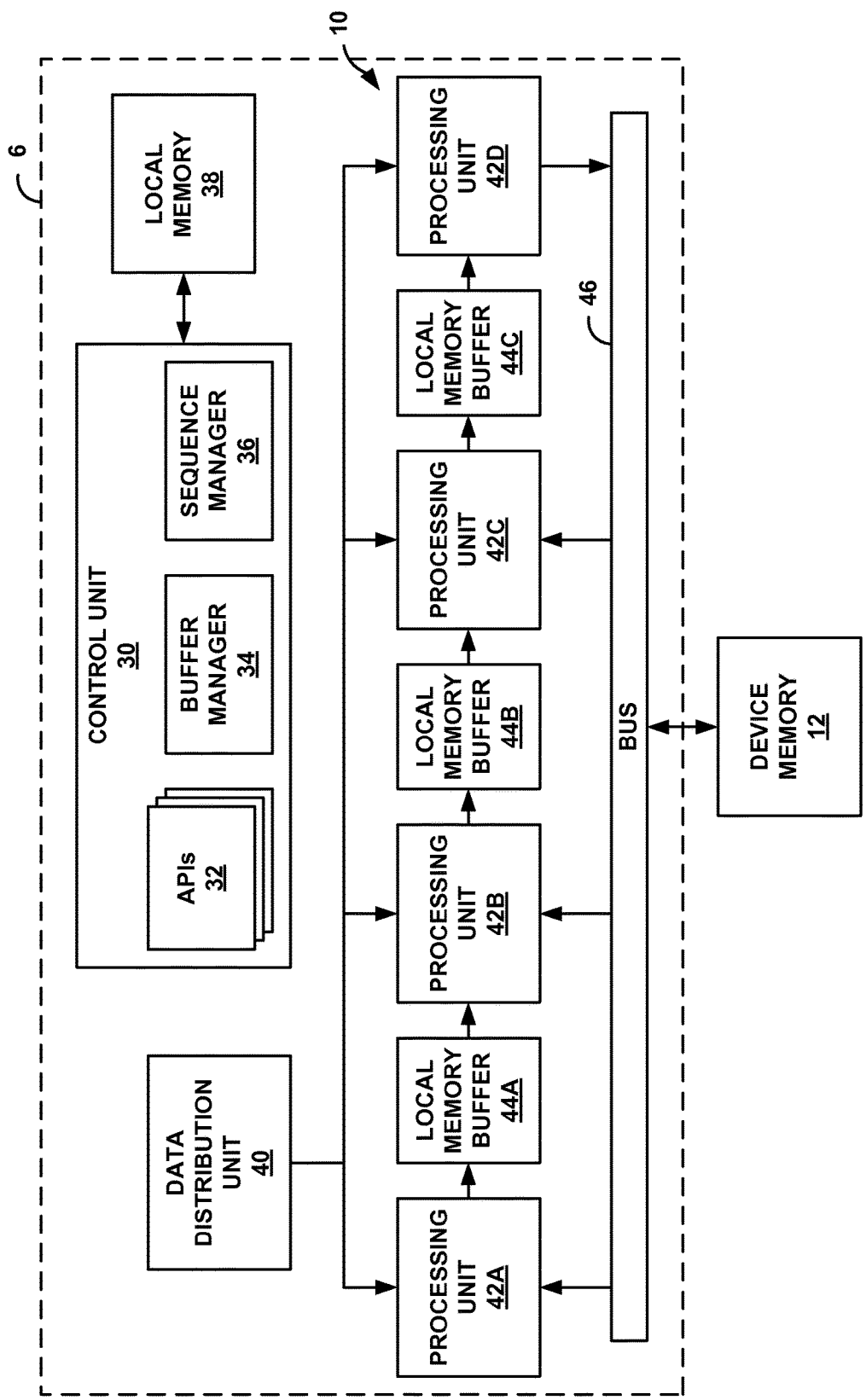
FIG. 3 is a block diagram illustrating one example of the GPGPU from FIG. 1 including parallel processing units and local memory buffers configured to implement a processing pipeline.

FIG. 3 is a block diagram illustrating an exemplary GPGPU 6 from FIG. 1, including parallel processing units 42A-42D and local memory buffers 44A-44C configured to implement a processing pipeline 10. In other examples, GPGPU 6 may include more or fewer parallel processing units and local memory buffers.

In the example of FIG. 3, GPGPU 6 includes a data distribution unit 40, parallel processing units 42A-42D ("parallel processing units 42"), and bus 46 to connect parallel processing units 42 to device memory 12 (from FIG. 1) external to GPGPU 6. Unlike a conventional GPGPU, such as GPGPU 18 from FIG. 3, GPGPU 6 also includes local memory buffers 44A-44C ("local memory buffers 44") connected between parallel processing units 42. The combination of parallel processing units 42 and local memory buffers 44 connected between parallel processing units 42 may be referred to as processing pipeline 10. GPGPU 6 also includes a control unit 30 and a local memory 38. Local memory 38 may comprise a buffer similar to local memory buffers 44, a register, or a cache that temporarily stores data for GPGPU 6. Control unit 30 includes application programming interfaces (APIs) 32, buffer manager 34, and sequence manager 36.

Local memory buffers 44 may include hardware-based data flow control mechanisms to enable transfer of data between parallel processing units 42. For example, local memory buffers 44 may comprise hardware-based first-in, first-out (FIFO) buffers or other types of hardware-based buffers, such as last-in, first-out (LIFO) buffers or indexed buffers. In the case where local memory buffer 44A comprises a hardware-based FIFO, for example, local memory buffer 44A includes data flow control mechanisms that allow parallel processing unit 42A to send data to local memory buffer 44A when there is space to write data to the buffer, and otherwise stall the write request. In that case, local memory buffer 44A also includes data flow control mechanisms that allow parallel processing unit 42B to receive data from local memory buffer 44A when there is data available to read from the buffer, and otherwise stall the read request. When local memory buffers 44 include hardware-based data flow control mechanisms, less efficient software-based data flow controls are not necessary to enable transfer of data between parallel processing unit 42.

Local memory buffers 44 allow on-chip, low-power, direct data transfer between parallel processing units 42. Local memory buffers 44 are "local" because they are located within GPGU 6 and on the same chip as processing units 42. In this way, data may be passed directly from one of parallel processing units 42 to another one of parallel processing units 42 in processing pipeline 10 via local memory buffers 44. Parallel processing units 42 are not required to repeatedly retrieve and store data with device memory 12, which is external to or located off-chip from GPGPU 6. Local memory buffers 44, therefore, transform parallel processing units 42 into a series of pipeline stages and implement processing pipeline 10 within GPGPU 6.

In the illustrated example, each of local memory buffers 44 is directly connected between two of the parallel processing units 42 in successive order such that processing pipeline 10 is a purely serial pipeline. Local memory buffers 44 are "directly" connected in that they are only accessible by the two parallel processing units 42 to which they are connected and are not bus addressable by any of parallel processing units 42. For example, local memory buffer 44A is directly connected between parallel processing units 42A and 42B, local memory buffer 44B is directly connected between parallel processing units 42B and 42C, and local memory buffer 44C is directly connected between parallel processing units 42C and 42D.

In other examples, each of local memory buffers 44 may also be directly connected to one or more of parallel processing units 42 that are not in successive order. In this case, each of local memory buffers 44 may be directly connected to any of parallel processing units 42 via cross-bar connections. For example, local memory buffer 44A may be directly connected to each of parallel processing units 42 via a cross-bar connection such that parallel processing unit 42A may transfer data to any of parallel processing units 42B-42D via local memory buffer 44A. The use of cross-bar connections make local memory buffers 44 more widely accessible to parallel processing units 42 and enable implementation of processing pipelines that are not purely serial.

In the illustrated example in which processing pipeline 10 comprises a purely serial pipeline, parallel processing units 42 may only have permission to write data to a successive one of local memory buffers 44, and may only have permission to read data from a previous one of local memory buffers 44. For example, parallel processing unit 42B may only be able to read data from local memory buffer 44A and only be able to write data to local memory buffer 44B. In cases where the processing pipeline may include cross-bar connections, parallel processing unit 42 may have permission to both read and write to any of local memory buffers 44. For example, parallel processing unit 42B may be able to read and write data with local memory buffer 44A and with local memory buffer 44B.

As described above, local memory buffers 44 may comprise at least one of FIFO buffers, LIFO buffers, or indexed buffers. The type of buffer used for local memory buffers 44 may depend on the type of hardware-based data flow control mechanisms required in processing pipeline 10. The type of buffer used for local memory buffers 44 may also depend on whether local memory buffers 44 are connected to parallel processing units 42 via one-to-one connections or cross-bar connections. In addition, when cross-bar connections are used, buffer manager 34 of control unit 30 may need to perform some memory control to manage which parallel processing unit 42 is accessing which local memory buffer 44 at a given time.

As described above, local memory buffers 44 may be directly connected between at least two of parallel processing units 42 via either one-to-one or cross-bar connections. Local memory buffers 44, however, may not be bus addressable by parallel processing units 42. In this way, a designated memory controller for local memory buffers 44 may not be necessary. Specifically, a memory controller is not necessary to process read and write commands to local memory buffers 44 over a bus.

Local memory buffers 44 may significantly reduce memory bandwidth usage by reducing or eliminating the need for each of parallel processing units 42 to make calls to device memory 12 via bus 46 to retrieve and/or store data. In operation, parallel processing unit 42A, as the first processing unit of processing pipeline 10, retrieves an original data set from device memory 12 via bus 46. The data set may be assigned to parallel processing unit 42A by data distribution unit 40. In addition, parallel processing unit 42D, as the final processing unit of processing pipeline 10, stores a post-pipeline data set in device memory 12 via bus 46. Parallel processing units 42B and 42C, as the intermediate processing units of processing pipeline 10, receive the data set from a previous one of parallel processing units 42 via one of local memory buffers 44, and send the data set to a subsequent one of parallel processing unit 42 via one of local memory buffers 44. The intermediate processing units, therefore, are not required to interact with device memory 12 to retrieve and/or store data. In some cases, the intermediate processing units may retrieve supplemental data from device memory in order to perform the particular stage of processing pipeline 10. The main data set for processing, however, is passed directly along processing pipeline 10 via local memory buffers 44.

As described above, GPGPU 6 is a generalized version of a GPU that extends the high power parallel processing of the GPU to general purpose data processing applications beyond graphics processing. As an example, GPGPU 6 may be configured to process data in accordance with the OpenCL specification that gives certain applications access to a graphics processing unit for non-graphical computing. In OpenCL terminology, data threads are referred to as work items, data sets are referred to as work groups, processing units are referred to as compute units, and a collection of processing units referred to as a compute group.

According to the techniques of this disclosure, GPGPU 6 is configurable to implement processing pipeline 10 to execute pipeline-based applications, including 2D and 3D graphics processing applications. More specifically, control unit 30 of GPGPU 6 configures parallel processing units 42 to operate as stages of a processing pipeline. Control unit 30 also configures local memory buffers 44 connected between parallel processing units 42 to hold data for transfer between parallel processing units 42.

Parallel processing units 42 may be programmable or configurable to perform different operations depending on the application executed by GPGPU 6. Control unit 30 may configure each of parallel processing units 42 to operate in accordance with the application. For example, each of parallel processing units 22 may comprise a cluster of arithmetic logic units (ALUs) or other configurable logic elements.

Local memory buffers 44 may also be programmable or configurable to hold different types of data output from parallel processing units 42 depending on the application executed by GPGPU 6. For example, local memory buffers 44 may comprise hardware-based buffers, but include a set of configurable aspects. One of the configurable aspects may be the width of local memory buffers 44 in order to accommodate the different types of data output from parallel processing units 42. For example, local memory buffers 44 may be configurable to trade depth for width. Buffer manager 34 of control unit 30 may determine a width required for each of local memory buffers 44 to hold the data output from a previous one of parallel processing units 42. Buffer manager 34 may be aware of the type of data output from each of parallel processing units 42 and, therefore, aware of the widths required by each of local memory buffers 44 to hold the data. Buffer manager 34 may then configure each of local memory buffers 44 to have the determined width.

Once parallel processing units 42 and local memory buffers 44 are configured to implement processing pipeline 10 within GPGPU 6, parallel processing units 42 may transfer data via local memory buffers 44. Control unit 30 may configure one or more of parallel processing units 42 to send data to local memory buffers 44, and configure one or more of parallel processing units 44 to receive data from local memory buffers 44. For example, control unit 30 may configure parallel processing units 42A, 42B and 42C to send data to local memory buffers 44A, 44B and 44C, respectively. Control unit 30 may also configure parallel processing units 42B, 42C and 42D to receive data from local memory buffers 44A, 44B and 44C, respectively.

Local memory buffers 44 with hardware-based flow control mechanisms may be exposed using a GPGPU standard, such as the OpenCL standard, by introducing new APIs 32. For example, control unit 30 may execute one or more of APIs 32 to determine the width required for each of local memory buffers 44, configure each of local memory buffers 44 with the determined width, and determine a depth of each of local memory buffers 44. In addition, control unit 30 may execute one or more of APIs 32 to configure parallel processing units 42 send data to local memory buffers 44 and receive data from local memory buffers 44. The hardware-based data flow control mechanisms included in local memory buffers 44 allow parallel processing units 42 to send data to and receive data from local memory buffers 44 without any additional software-based data flow controls.

In addition, control unit 30 of GPGPU 6 may preserve data sequence within processing pipeline 10 by preserving data sequence within one or more of parallel processing units 42. Pipeline-based applications executed by GPGPU 6, specifically 3D graphics applications, may require data to be processed in a certain sequence within processing pipeline 10. When data is processed at each stage of the processing pipeline, the data may change sequence due to execution issues, such as conditionals, cache hits or misses, and the like. Sequence manager 36 of control unit 30 may execute sequencing barriers to preserve data sequence within at least some of parallel processing units 42. The sequencing barriers may slow down processing speed within processing pipeline 10, so sequence manager 36 may only execute the sequencing barriers at those parallel processing units 42 that require data sequence preservation for accurate processing.

The sequencing barriers executed by sequence manager 36 may include a sequence-determining counter (SDC) and a sequence-enforcing barrier (SEB). For example, the sequencing barriers may be exposed using a GPGPU standard, such as the Open CL standard, by adding new function calls to OpenCL C language for the SDC and the SEB.

Sequence manager 36 may execute the SDC upon entry of a data set to any one of parallel processing units 42. Sequence manager 36 then performs the SDC operation by recording a sequence of data threads of the received data set within local memory 38. For example, sequence manager 36 may record an index of each data thread of the data set in the order in which the data threads are received from device memory 12.

Sequence manager 36 may execute the SEB upon exit of the data set from the one of parallel processing units 42. Sequence manager 36 then performs the SEB operation by releasing the data threads of the data set from the one of parallel processing units 42 in the same sequence as recorded by the SDC. For example, sequence manager 36 may access the data thread indices recorded in local memory 38, and release each data thread according to the order in which its index was recorded. In this way, the data threads of the data set will enter a subsequent one of parallel processing units 42 in the same order as the data threads of the data set entered the current one of parallel processing units 42.

In one example, control unit 30 may configure GPGPU 6 to execute a pipeline-based 3D graphics processing application. In that case, control unit 30 may configure parallel processing units 42 to operate as stages of a 3D graphics processing pipeline. For example, control unit 30 may configure parallel processing unit 42A to operate as a vertex shader, parallel processing unit 42B to operate as a triangle rasterizer, parallel processing unit 42C to operate as a fragment shader, and parallel processing unit 42D to operate as a pixel blender.

Control unit 30 may also configure local memory buffers 44 with hardware-based data flow control mechanisms to hold data for transfer between parallel processing units 42 to implement 3D graphics processing pipeline 10. For example, control unit 30 may configure local memory buffer 44A to hold post-vertex shader vertex data for transfer between parallel processing unit 42A operating as the vertex shader and parallel processing unit 42B operating as the triangle rasterizer. Control unit 30 may configure local memory buffer 44B to hold pre-fragment shader pixel data for transfer between parallel processing unit 42B operating as the triangle rasterizer and parallel processing unit 42C operating as the fragment shader. Finally, control unit 30 may configure local memory buffer 44C to hold post-fragment shader pixel values for transfer between parallel processing unit 42C operating as the fragment shader and parallel processing unit 42D operating as the pixel blender.

Upon executing the 3D graphics processing applications, data distribution unit 40 may assign an original vertex data set to parallel processing unit 42A operating as the vertex shader. Parallel processing unit 42A retrieves the assigned original vertex data set from device memory 12 via bus 46. Upon entry of the data set, sequence manager 36 executes the SDC to record a sequence of the vertex data. Parallel processing unit 42A then performs a vertex shading operation and sends the post-vertex shader vertex data to local memory buffer 44A. Upon exit of the data set from parallel processing unit 42A, sequence manager 36 executes the SEB to release the vertex data in the same sequence as recorded by the SDC. In this way, the vertex data will arrive at parallel processing unit 42B, operating as the triangle rasterizer, in the same order as the vertex data entered parallel processing unit 42A, operating as the vertex shader.

Parallel processing unit 42B, operating as the triangle rasterizer, receives the post-vertex shader vertex data from local memory buffer 44A. In some cases, parallel processing unit 42B may also retrieve supplemental data from device memory 12 via bus 46 in order to perform a triangle rasterizing operation. Parallel processing unit 42B then performs the triangle rasterizing operation and sends the pre-fragment shader pixel data to local memory buffer 44B. In some examples, sequence manager 36 may execute the SDC upon entry of the vertex data to parallel processing unit 42B, and execute the SEB upon exit of the pixel data from parallel processing unit 42B to preserve data sequence. In other examples, the sequencing barriers may not be necessary and, therefore, not executed for parallel processing unit 42B.

Parallel processing unit 42C, operating the fragment shader, receives the pre-fragment shader pixel data from local memory buffer 44B. Upon entry of the data set, sequence manager 36 executes the SDC to record a sequence of the pixel data. In some cases, parallel processing unit 42C may also retrieve supplemental data from device memory 12 via bus 46 in order to perform a fragment shader operation. Parallel processing unit 42C then performs the fragment shading operation and sends the post-fragment shader pixel values to local memory buffer 44C. Upon exit of the data set from parallel processing unit 42C, sequence manager 36 executes the SEB to release the pixel data in the same sequence as recorded by the SDC. In this way, the pixel data will arrive at parallel processing unit 42D, operating as the pixel blender, in the same order as the pixel data entered parallel processing unit 42C, operating as the fragment shader.

Parallel processing unit 42D, operating as the pixel blender, receives the post-fragment shader pixel values from local memory buffer 44C. Parallel processing unit 44D then performs a pixel blending operation and stores the post-pipeline data set in device memory 12 via bus 46. In some examples, sequence manager 36 may execute the SDC upon entry of the pixel data to parallel processing unit 42D, and execute the SEB upon exit of the image data from parallel processing unit 42D to preserve data sequence. In other examples, the sequencing barriers may not be necessary and, therefore, not executed for parallel processing unit 42D. The above described example of a 3D graphics processing application is merely exemplary and the disclosed techniques may be used to execute a variety of pipeline-based applications in GPGPU 6.

Figure 4:
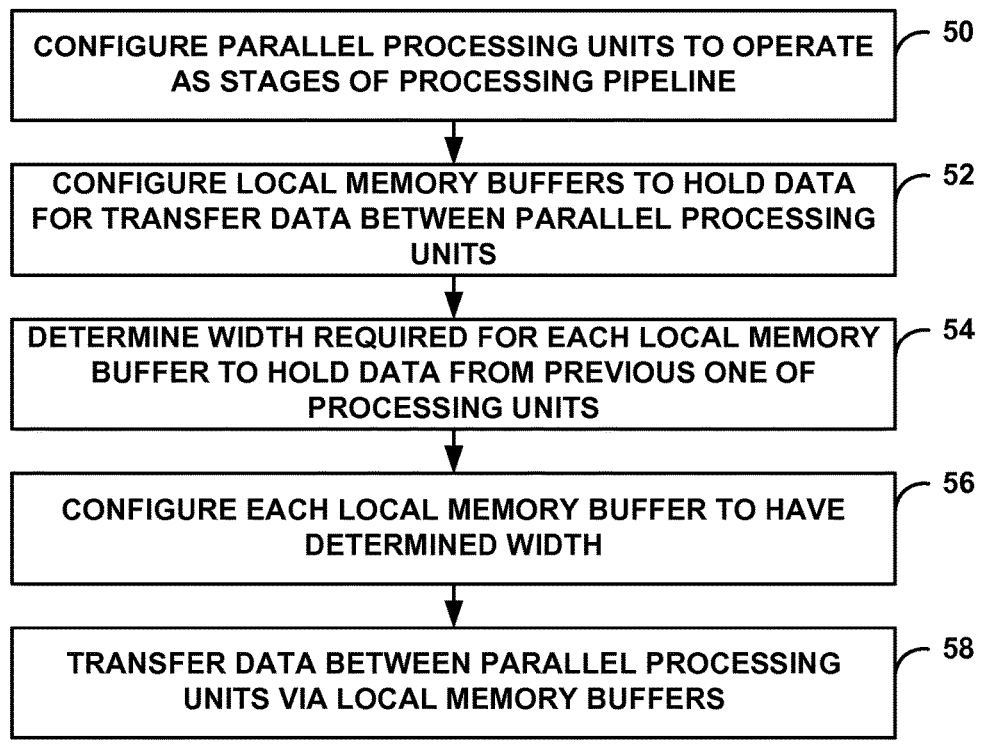
FIG. 4 is a flow chart illustrating an example operation of the GPGPU including local memory buffers connected to parallel processing units to transfer data between the parallel processing units as stages of a processing pipeline.

FIG. 4 is a flow chart illustrating an example operation of GPGPU 6 including local memory buffers 44 connected to parallel processing units 42 to transfer data between the parallel processing units as stages of processing pipeline 10. The illustrated operation is described with reference to GPGPU 6 from FIG. 3.

Control unit 30 of GPGPU 6 configures parallel processing units 42 to operate as stages of processing pipeline 10 (50). For example, control unit 30 may configure parallel processing units 42 to operate as stage of a 3D graphics processing pipeline. In that example, control unit 30 may configure parallel processing unit 42A to operate as a vertex shader, parallel processing unit 42B to operate as a triangle rasterizer, parallel processing unit 42C to operate as a fragment shader, and parallel processing unit 42D to operate as a pixel blender.

Control unit 30 also configures local memory buffers 44 to hold data for transfer between parallel processing units 42, in effect transforming parallel processing units 42 into processing pipeline 10 (52). Local memory buffers 44 may include hardware-based data flow control mechanisms to enable transfer of data between parallel processing units 42. For example, local memory buffers 44 may comprise hardware-based FIFOs, LIFOs, or indexed buffers. Local memory buffers 44 may be directly connected between at least two of parallel processing units 42. For example, in the case of a 3D graphics processing pipeline, local memory buffer 44A may be directly connected between parallel processing unit 42A operating as the vertex shader and parallel processing unit 42B operating as the triangle rasterizer, and configured to hold post-vertex shader vertex data. Local memory buffer 44B may be directly connected between parallel processing unit 32B operating as the triangle rasterizer and parallel processing unit 42C operating as the fragment shader, and configured to hold pre-fragment shader pixel data. Finally, local memory buffer 44C may be directly connected between parallel processing unit 42C operating as the fragment shader and parallel processing unit 42D operating as the pixel blender, and configured to hold post-fragment shader pixel values.

In addition, buffer manager 34 of control unit 30 may determine a width required for each of local memory buffers 44 to hold the data output from a previous one of parallel processing units 42 (54). Buffer manager 34 may be aware of the type of data output from each of parallel processing units 42 and, therefore, aware of the widths required by each of local memory buffers 44 to hold the data. Buffer manager 34 may then configure each of local memory buffers 44 to have the determined width (56). In some cases, local memory buffers 44 may be hardware-based, but include a set of configurable aspects. For example, local memory buffers 44 may be configurable to trade depth for width.

For example, buffer manager 34 may be aware that parallel processing unit 42A operating as the vertex shader outputs post-vertex shader vertex data, and configure local memory buffer 44A to have the width required to hold the post-vertex shader vertex data. Buffer manager 34 may also be aware that parallel processing unit 42B operating as the triangle rasterizer outputs pre-fragment shader pixel data, and configure local memory buffer 44B to have the width required to hold the pre-fragment shader pixel data. Moreover, buffer manager 34 may be aware that parallel processing unit 42C operating as the fragment shader outputs post-fragment shader pixel values, and configure local memory buffer 44C to have the width required to hold the post-fragment shader pixel values.

Once parallel processing units 42 and local memory buffers 44 are configured to implement processing pipeline 10 within GPGPU 6, parallel processing units 42 may transfer data between one another via local memory buffers 44 (58). More specifically, control unit 30 may configure one or more of parallel processing units 42 to send data to local memory buffers 44, and configure one or more of parallel processing units 44 to receive data from local memory buffers 44. For example, control unit 30 may configure parallel processing units 42A, 42B and 42C to send data to local memory buffers 44A, 44B and 44C, respectively. Control unit 30 may also configure parallel processing units 42B, 42C and 42D to receive data from local memory buffers 44A, 44B and 44C, respectively.

Figure 5:
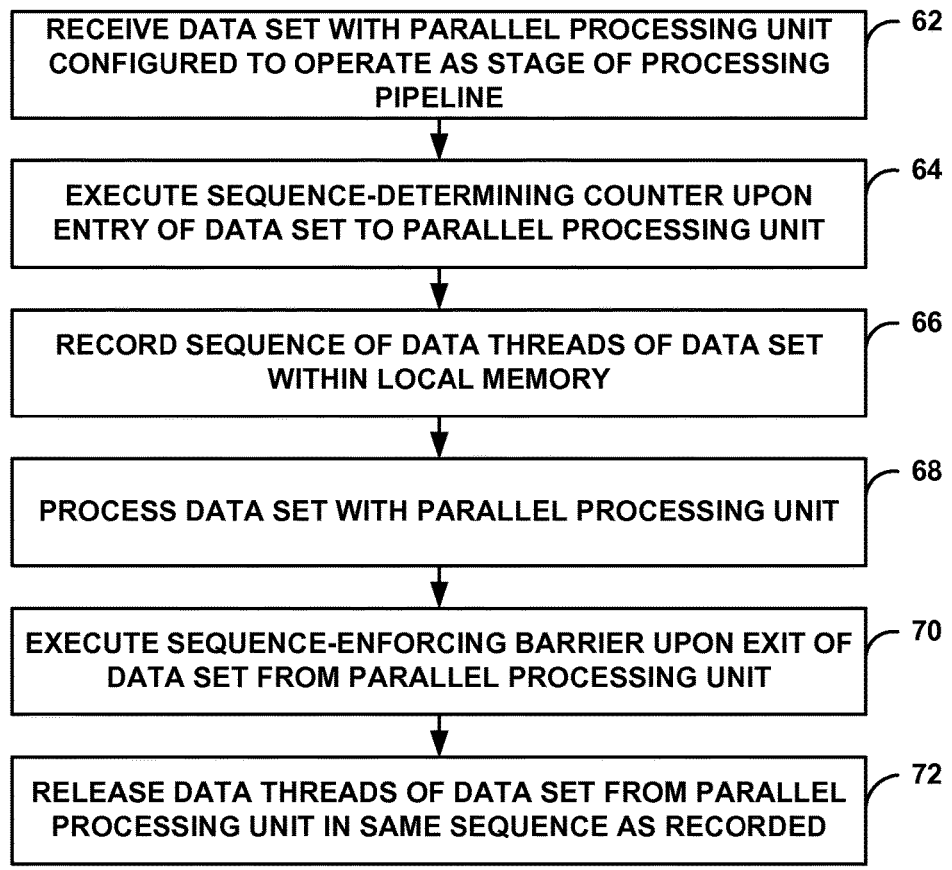
FIG. 5 is a flow chart illustrating an example operation of preserving a data sequence within a processing pipeline implemented by parallel processing units and local memory buffers of the GPGPU.

FIG. 5 is a flow chart illustrating an example operation of preserving data sequence within the processing pipeline implemented by parallel processing units 42 and local memory buffers 44 of GPGPU 6. Control unit 30 of GPGPU 6 may preserve data sequence within the processing pipeline by preserving data sequence within one or more of parallel processing units 42. The illustrated operation is described with reference to parallel processing unit 42A of GPGPU 6 from FIG. 3. A similar operation may be performed for any of the other parallel processing units 42.

As an example, parallel processing units 42 and local memory buffers 44 may be configured to implement a 3D graphics processing pipeline. In that example, parallel processing unit 42A may be configured to operate as a vertex shader, parallel processing unit 42B may be configured to operate as a triangle rasterizer, parallel processing unit 42C may be configured to operate as a fragment shader, and parallel processing unit 42D may be configured to operate as a pixel blender.

Parallel processing unit 42A configured to operate as a stage of processing pipeline 10, e.g., the vertex shader, receives a data set for processing (62). For example, data distribution unit 40 may assign a data set of vertex data to parallel processing unit 42A, and parallel processing unit 42A may receive the assigned data set from device memory 12 via bus 46. Upon entry of the data set to parallel processing unit 42A, sequence manager 36 of control unit 30 executes a sequence-determining counter (SDC) (64). In accordance with the SDC, sequence manager 36 records a sequence of data threads of the received data set within local memory 38 (66). For example, sequence manager 36 may record an index of each data thread of the data set in the order in which the data threads are received from device memory 12.

Parallel processing unit 42A configured to operate as the vertex shader then processes the data set to generate post-vertex shader vertex data (68). As described above, parallel processing unit 42A may be configured to send the post-vertex shader vertex data to local memory buffer 44A in order to transfer the data set to parallel processing unit 42B configured to operate as the triangle rasterizer. Upon exit of the data set from parallel processing unit 42A, sequence manager 36 executes a sequence-enforcing barrier (SEB) (70). In accordance with the SEB, sequence manager 36 releases the data threads of the data set from parallel processing unit 42A in the same sequence as recorded by the SDC (72). For example, sequence manager 36 may access the data thread indices recorded in local memory 38, and release each data thread according to the order in which its index was recorded. In this way, the vertices will enter parallel processing unit 42B configured to operate as the triangle rasterizer in the same order as the vertices entered parallel processing unit 42A configured to operate as the vertex shader.

In one or more examples, the functions described may be implemented in hardware, software, firmware, or any combination thereof. If implemented in software, the functions or operations may be stored as one or more instructions or code on a non-transitory computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A general purpose graphics processing unit (GPGPU) comprising:
   two or more programmable parallel processing units of the GPGPU configured to operate selectively as stages of a processing pipeline;
   one or more programmable local memory buffers of the GPGPU, wherein each of the local memory buffers is directly connected between at least two of the parallel processing units in the processing pipeline and is configured to hold data for transfer between the parallel processing units; and
   a control unit configured to:
      execute one or more application programming interfaces (APIs) to configure the two or more programmable parallel processing units of the GPGPU to operate as the stages of the processing pipeline to send data to the directly connected local memory buffers and receive data from the directly connected local memory buffers,
      execute the one or more APIs to configure each of the one or more programmable local memory buffers to have a width necessary to hold the data for transfer between the parallel processing units, and
      execute a sequence manager to preserve data sequence within the processing pipeline implemented by the two or more programmable parallel processing units and the one or more programmable local memory buffers, the control unit configured to execute a sequence-determining counter upon entry of a data set to at least one of the parallel processing units to record a sequence of data threads of the data set, and execute a sequence-enforcing barrier upon exit of the data set from the at least one of the parallel processing units to release the data threads of the data set from the parallel processing unit in the same sequence as recorded by the sequence-determining counter.

2. The GPGPU of claim 1, wherein the one or more local memory buffers include hardware-based data flow control mechanisms to enable transfer of the data between the parallel processing units.

3. The GPGPU of claim 1, wherein the one or more local memory buffers comprise at least one of hardware-based first-in, first-out buffers (FIFOs), last-in, first-out buffers (LIFOs), or indexed buffers.

4. The GPGPU of claim 1, wherein the control unit is configured to, for each of the local memory buffers, execute the one or more APIs to configure a previous one of the parallel processing units in the processing pipeline to send data to a respective one of the local memory buffers to which it is directly connected, and execute the one or more APIs to configure a subsequent one of the parallel processing units in the processing pipeline to receive data from the respective one of the local memory buffers to which it is directly connected.

5. The GPGPU of claim 1, wherein the control unit is configured to execute the one or more APIs to determine the width necessary for each of the local memory buffers to hold data output from a previous one of the parallel processing units in the processing pipeline, and execute the one or more APIs to configure each of the local memory buffers to have the determined width.

6. The GPGPU of claim 5, wherein the control unit is further configured to execute the one or more APIs to determine a depth of each of the local memory buffers, and wherein each of the local memory buffers is configurable to trade the depth for the width.

7. The GPGPU of claim 1, wherein one of the parallel processing units is configured to operate as a first stage of the processing pipeline and retrieve an original data set from a device memory.

8. The GPGPU of claim 1, wherein one of the parallel processing units is configured to operate as a final stage of the processing pipeline and store a pipeline processed data set in a device memory.

9. The GPGPU of claim 1, wherein at least one of the parallel processing units is configured to operate as an intermediate stage of the processing pipeline, receive a data set from a previous one of the parallel processing units in the processing pipeline via one of the local memory buffers, and send the data set to a subsequent one of the parallel processing units in the processing pipeline via another one of the local memory buffers.

10. The GPGPU of claim 9, wherein the at least one of the parallel processing units is configured to retrieve supplemental data from a device memory to process the data set.

11. A method of processing data with a general purpose graphics processing unit (GPGPU), the method comprising:
   configuring, by one or more application programming interfaces (APIs) executed by a control unit of the GPGPU, two or more programmable parallel processing units of the GPGPU to operate selectively as stages of a processing pipeline that send data to directly connected programmable local memory buffers and receive data from directly connected programmable local memory buffers;
   configuring, by the one or more APIs executed by the control unit of the GPGPU, each of one or more programmable local memory buffers of the GPGPU directly connected between at least two of the parallel processing units in the processing pipeline to have a width necessary to hold data for transfer between the parallel processing units; and
   preserving, by a sequence manager executed by the control unit of the GPGPU, data sequence within the processing pipeline implemented by the two or more programmable parallel processing units and the one or more programmable local memory buffers, wherein preserving the data sequence comprises executing a sequence-determining counter upon entry of a data set to at least one of the parallel processing units to record a sequence of data threads of the data set, and executing a sequence-enforcing barrier upon exit of the data set from the at least one of the parallel processing units to release the data threads of the data set from the parallel processing unit in the same sequence as recorded by the sequence-determining counter.

12. The method of claim 11, wherein the one or more local memory buffers include hardware-based data flow control mechanisms to enable transfer of the data between the parallel processing units.

13. The method of claim 11, wherein the one or more local memory buffers comprise at least one of hardware-based first-in, first-out buffers (FIFOs), last-in, first-out buffers (LIFOs), or indexed buffers.

14. The method of claim 11, wherein, for each of the local memory buffers, configuring the two or more parallel processing units comprises:
   configuring, by the one or more APIs, a previous one of the parallel processing units in the processing pipeline to send data to a respective one of the local memory buffers to which it is directly connected; and
   configuring, by the one or more APIs, a subsequent one of the parallel processing units to receive data from the respective one of the local memory buffers.

15. The method of claim 11, wherein configuring the one or more local memory buffers comprises:
   determining, by the one or more APIs, the width necessary for each of the local memory buffers to hold data output from a previous one of the parallel processing units in the processing pipeline; and
   configuring, by the one or more APIs, each of the local memory buffers to have the determined width.

16. The method of claim 15, wherein configuring the one or more local memory buffers further comprises determining, by the one or more APIs, a depth of each of the local memory buffers, wherein each of the local memory buffers is configurable to trade the depth for the width.

17. The method of claim 11, wherein configuring two or more parallel processing units comprises configuring one of the parallel processing units to operate as a first stage of the processing pipeline and retrieve an original data set from a device memory.

18. The method of claim 11, wherein configuring two or more parallel processing units comprises configuring one of the parallel processing units to operate as a final stage of the processing pipeline and store a pipeline processed data set in a device memory.

19. The method of claim 11, wherein configuring two or more parallel processing units comprises configuring at least one of the parallel processing units to operate as an intermediate stage of the processing pipeline, receive a data set from a previous one of the parallel processing units in the processing pipeline via one of the local memory buffers, and send the data set to a subsequent one of the parallel processing units in the processing pipeline via another one of the local memory buffers.

20. The method of claim 19, wherein configuring at least one of the parallel processing units comprises configuring the at least one of the parallel processing units to retrieve supplemental data from a device memory to process the data set.

21. A general purpose graphics processing unit (GPGPU) comprising:
   means for executing one or more application programming interfaces (APIs) to configure two or more programmable parallel processing units of the GPGPU to operate selectively as stages of a processing pipeline that send data to directly connected programmable local memory buffers and receive data from directly connected programmable local memory buffers;
   means for executing the one or more APIs to configure each of one or more programmable local memory buffers of the GPGPU directly connected between at least two of the parallel processing units in the processing pipeline to have a width necessary to hold data for transfer between the parallel processing units; and
   means for executing a sequence manager to preserve data sequence within the processing pipeline implemented by the two or more programmable parallel processing units and the one or more programmable local memory buffers, wherein the means for preserving the data sequence comprises means for executing a sequence-determining counter upon entry of a data set to at least one of the parallel processing units to record a sequence of data threads of the data set, and means for executing a sequence-enforcing barrier upon exit of the data set from the at least one of the parallel processing units to release the data threads of the data set from the parallel processing unit in the same sequence as recorded by the sequence-determining counter.

22. The GPGU of claim 21, wherein the one or more local memory buffers include hardware-based data flow control mechanisms to enable transfer of the data between the parallel processing units.

23. The GPGPU of claim 21, wherein the means for executing the one or more APIs to configure the two or more programmable parallel processing units comprises:
   means for executing the one or more APIs to configure, for each of the local memory buffers, a previous one of the parallel processing units in the processing pipeline to send data to a respective one of the local memory buffers to which it is directly connected; and
   means for executing the one or more APIs to configure, for each of the local memory buffers, a subsequent one of the parallel processing units in the processing pipeline to receive data from the respective one of the local memory buffers to which it is directly connected.

24. The GPGPU of claim 21, wherein the means for executing the one or more APIs to configure the one or more local memory buffers comprises:
   means for executing the one or more APIs to determine the width necessary for each of the local memory buffers to hold data output from a previous one of the parallel processing units in the processing pipeline; and
   means for executing the one or more APIs to configure each of the local memory buffers to have the determined width.

25. The GPGPU of claim 24, further comprising means for executing the one or more APIs to determine a depth of each of the local memory buffers, wherein each of the local memory buffers is configurable to trade the depth for the width.

26. A non-transitory computer-readable medium comprising instructions for processing data with a general purpose graphics processing unit (GPGPU) that, when executed, cause a programmable processor of a control unit of the GPGPU to:
   execute one or more application programming interfaces (APIs) to configure two or more programmable parallel processing units of the GPGPU to operate selectively as stages of a processing pipeline that send data to directly connected programmable local memory buffers and receive data from directly connected programmable local memory buffers;
   execute the one or more APIs to configure each of one or more programmable local memory buffers of the GPGPU directly connected between at least two of the parallel processing units in the processing pipeline to have a width necessary to hold data for transfer between the parallel processing units; and execute a sequence manager to preserve data sequence within the processing pipeline implemented by the two or more programmable parallel processing units and the one or more programmable local memory buffers, wherein the instructions case the programmable processor to execute a sequence-determining counter upon entry of a data set to at least one of the parallel processing units to record a sequence of data threads of the data set, and execute a sequence-enforcing barrier upon exit of the data set from the at least one of the parallel processing units to release the data threads of the data set from the parallel processing unit in the same sequence as recorded by the sequence-determining counter.

27. The non-transitory computer-readable medium of claim 26, wherein the one or more local memory buffers include hardware-based data flow control mechanisms to enable transfer of the data between the parallel processing units.

28. The non-transitory computer-readable medium of claim 26, further comprising instructions that cause the programmable processor to, for each of the local memory buffers:

execute the one or more APIs to configure a previous one of the parallel processing units in the processing pipeline to send data to a respective one of the local memory buffers to which it is directly connected; and execute the one or more APIs to configure a subsequent one of the parallel processing units in the processing pipeline to receive data from the respective one of the local memory buffers to which it is directly connected.

29. The non-transitory computer-readable medium of claim 26, further comprising instructions that cause the programmable processor to:

execute the one or more APIs to determine the width necessary for each of the local memory buffers to hold data output from a previous one of the parallel processing units in the processing pipeline; and execute the one or more APIs to configure each of the local memory buffers to have the determined width.

30. The non-transitory computer-readable medium of claim 29, further comprising instructions that cause the programmable processor to execute the one or more APIs to determine a depth of each of the local memory buffers, wherein each of the local memory buffers is configurable to trade the depth for the width.

* * * * *